(12) United States Patent
Beck

(10) Patent No.: US 7,490,437 B1
(45) Date of Patent: Feb. 17, 2009

(54) RUMINANT FEED RATION CONTAINING FEED COMPONENTS CHARACTERIZED IN REAL TIME

(76) Inventor: James F. Beck, 13823 Jasmine Way, Rogers, MN (US) 55374

(*) Notice: Subject to any disclaimer, the term of this patent is extended or adjusted under 35 U.S.C. 154(b) by 0 days.

(21) Appl. No.: 11/584,767

(22) Filed: Oct. 20, 2006

Related U.S. Application Data

(63) Continuation of application No. 10/867,877, filed on Jun. 15, 2004, now Pat. No. 7,174,672.

(60) Provisional application No. 60/480,462, filed on Jun. 20, 2003.

(51) Int. Cl.
*A01G 17/02* (2006.01)
(52) U.S. Cl. .................................. 47/58.1 FV
(58) Field of Classification Search ............. 119/51.01, 119/51.02; 47/1.01 R, 58.1 R, 58.1 FV; 356/326; 426/635; 436/20; 250/339.09, 339.11, 341.8
See application file for complete search history.

(56) References Cited

U.S. PATENT DOCUMENTS

| | | | |
|---|---|---|---|
| 6,844,194 B1 * | 1/2005 | Camerer et al. ............... | 436/20 |
| 2004/0180124 A1 * | 9/2004 | Beck et al. .................. | 426/460 |

OTHER PUBLICATIONS

Givens D.I. and Deaville, E.R. "The Current and Future Role of Near Infrared Reflectance Spectroscopy in Animal Nutrition: A Review," *Aust. J. Agric. Res*, 50, 1131-45 (1999).

Wrigley, C. W. "Potential Methodologies and Strategies for the Rapid Assessment of Feed-Grain Quality," *Aust. J. Agric. Res.*, 50, 789-805 (1999).

Dorsey-Redding, et al. "Relationships Among Maize Quality Factors," *American Association of Cereal Chemists, Inc.*, vol. 68, No. 6, 602-605 (1991).

Fox, et al. "Relations of Grain Proximate Composition and Physical Properties to Wet-Milling Characteristics of Maize," *American Association of Cereal Chemists, Inc.*, vol. 69, No. 2, 191-197 (1992).

Rippke, G.R., et al. "Calibration and Field Standardization of Tecator Infratec Analyzers for Corn and Soybeans," *In Proc. Int. Conf on Near Infrared Spectroscopy*, $7^{th}$ Montreal, Canada, 122-131 (Aug. 6-11, 1995).

Merberg Ph. D., Glenn et al. "Use of Near Infrared Analysis for the Evaluation of Rice Quality" *Presented at the $26^{th}$ Rice Technical Working Group San Antonia, Texas* 1996 http://www.zeltex.com/merberg.html.

"Assessing Quality and Safety of Animal Feeds" *Food and Agriculture Organization of the United Nations*, Rome 2004.

* cited by examiner

*Primary Examiner*—Trinh T. Nguyen
(74) *Attorney, Agent, or Firm*—Moss & Barnett

(57) ABSTRACT

A method that accounts for environmental factors by measuring the starch and fiber degradation characteristics of a variety of genetically different crop plants and grain from crop plants in real time to determine how the crop plants should be conserved, processed and blended into a feed formulation that results in optimum productivity of the ruminant animal. A method further including determining starch digestibility characteristics of a set of crop plant samples comprising grain of said crop plant; developing a prediction equation based on said starch digestibility characteristics, obtaining a grain sample from a crop plant, determining in real time starch digestibility characteristics by NIRS of said sample by inputting data from said NIRS into said equation, storing and/or milling said grain on an identity preserved basis, and determining the amount of said crop plant to incorporate into a feed formulation based on the starch digestibility characteristics.

14 Claims, No Drawings

RUMINANT FEED RATION CONTAINING FEED COMPONENTS CHARACTERIZED IN REAL TIME

RELATED APPLICATIONS

This application is a continuation of application Ser. No. 10/867,877 filed on Jun. 15, 2004, now U.S. Pat. No. 7,174,672 which claims priority to U.S. provisional application Ser. No. 60/480,462 filed on Jun. 20, 2003, both of which are incorporated herein by reference in their entirety.

FIELD OF THE INVENTION

The present invention relates to a method for screening a crop plant for the plant's starch and/or fiber digestion characteristics. Particularly, the present invention is a method for accurately predicting the starch and fiber digestion characteristics of a crop plant by Near Infrared Spectrometer (NIRS) analysis and preserving the identity of the crop plants in order to create feed formulations that result in optimum productivity of ruminant animals.

BACKGROUND OF THE INVENTION

Starch is a major component of ruminant diets, often comprising over 30% of lactating dairy cow diets and over 60% of diets for beef feedlot finishing diets on a dry matter (DM) basis. In ruminants, starch can be fermented to volatile fatty acids in the rumen, digested to glucose in the small intestine, or fermented to volatile fatty acids in the large intestine. Degradability of dietary starch affects site of digestion and whole tract digestibility. Site of digestion, in turn, affects fermentation acid production, ruminal pH, microbial yield, and efficiency of microbial protein production. All such factors can affect the productivity of ruminant animals. Many factors affect site of starch digestion in ruminants including DM intake, forage content of the diet, processing, and conservation methods. Grain processing is costly but is often justified economically to increase degradability of starch. High moisture corn grain generally has higher starch degradability than dry corn grain. This is partly because vitreousness of corn endosperm increases with maturity at harvest (Philippeau and Michalet-Doreau, 1997). In addition, ensiling corn increases starch degradability (Philippeau and Michalet-Doreau, 1999). Stock et al. (1991) reported that solubility of endosperm proteins was highly related to moisture level in high moisture corn and solubility increased with time of storage. Endosperm proteins seem to decrease access of starch granules to amylolytic enzymes.

Endosperm type also affects starch degradability, and it is well known that the proportion of vitreous and floury endosperm varies by corn hybrid. Dado and Briggs (1996) reported that in vitro starch digestibility of seven hybrids of corn with floury endosperm was much higher than that for one yellow dent hybrid. Philippeau et al., (1996) reported much higher in situ ruminal starch degradation for dent corn compared to flint corn harvested at both the hard dough stage and mature (300 g kg$^{-1}$ and 450 g kg$^{-1}$ whole plant DM, respectively). Grain (grain refers broadly to a harvested commodity) processing increases the availability of starch in floury endosperm much more than starch in vitreous endosperm (Huntington, 1997). Cells in the floury endosperm are completely disrupted when processed, releasing free starch granules (Watson and Ramstad, 1987). In contrast, there is little release of starch granules during processing for vitreous endosperm because the protein matrix is thicker and stronger. It is generally assumed that corn with a greater proportion of floury endosperm might have greater starch digestibility and be more responsive to processing.

Neutral detergent fiber (NDF) from forage is an important component in many ruminant diets. Forage NDF is needed to stimulate chewing and secretion of salivary buffers to neutralize fermentation acids in the rumen. Increasing the concentration of NDF in forage would mean that less NDF would have to be grown or purchased by the farmer. Thus, crops with higher than normal NDF concentrations would have economic value as a fiber source. However, that value would be reduced or eliminated if the higher NDF concentration resulted in lower digestibility and lower available energy concentrations. Beck et al., WO/02096191, recognized the need for optimizing starch degradability by careful selection of corn having specific grain endosperm type, in view of the ruminal rate of starch degradation, moisture content, and conservation methods used, combined with selection of corn for silage production with specific characteristics for NDF content and NDF digestibility.

Selecting a plant based on its genetics for inclusion in a feed formulation results in inconsistent ruminant animal productivity. For example, selection of a corn hybrid based on its grain endosperm type will yield inconsistent ruminant animal productivity over time. Thus, the present invention includes analyzing the starch and fiber digestibility characteristics of grain and a crop plant for use as forage in real time. The present invention also includes preserving the identity of the grain and the crop plant used for forage based on their starch and fiber digestibility characteristics. The present invention further includes using the grain and crop plant used for forage from one or more identity preserved crop plants to create feed formulations that result in optimum productivity of the ruminant animal.

SUMMARY OF THE INVENTION

The method of the present invention takes into account environmental factors by measuring the starch and fiber degradation characteristics of a variety of genetically different crop plants and grain from crop plants in real time to determine how the crop plants should be blended into a feed formulation that results in optimum productivity of the ruminant animal.

The method of the present invention includes providing a feed formulation resulting in optimum ruminant productivity comprising the steps of determining starch digestibility characteristics of a set of crop plant samples comprising grain of the crop plant, developing a prediction equation based on the starch digestibility characteristics, obtaining a grain sample from a crop plant, determining in real time starch digestibility characteristics by NIRS of the sample by inputting electronically recorded near infrared spectrum data from said NIRS into said equation, storing and/or milling said grain on an identity preserved basis, and determining the amount of the crop plant to incorporate into a feed formulation based on the starch digestibility characteristics.

The method of the present invention also includes providing a ruminant diet resulting in optimum ruminant productivity comprising the steps of, determining starch digestibility characteristics of grain from genetically different crop plants, determining dNDF characteristics of genetically different crop plants for use as forage, developing prediction equations based on the starch digestibility and dNDF characteristics, obtaining grain samples for use as feed supplements and crop plants for use as forage, determining starch and NDF digestibility characteristics by NIRS of the grain samples and the crop plants by inputting electronically recorded near infrared spectrum data relating to the characteristics into the equations and determining the amounts of the grain and the crop plants to incorporate into a feed formulation based on the starch and NDF digestibility characteristics.

The method of the present invention further includes providing a ruminant diet resulting in optimum ruminant productivity comprising the steps of, determining in real time starch digestibility characteristics of grain from a crop plants, determining in real time NDF digestibility characteristics of crop plants for use as forage, preserving the grain and the crop plants for use as forage on an identity preserved basis, and determining the amounts of the grain and the crop plants for use a forage to incorporate into a feed formulation based on the starch and NDF digestibility characteristics.

The method of the present invention also includes incorporating an amount of grain into a feed formulation.

The method of the present invention further comprises comprising the step of determining a conservation method based on the starch digestibility characteristics of identity preserved grain of the crop plant.

The method of the present invention includes a conservation method that comprises harvesting grain for storage as high moisture grain.

The method of the present invention further comprises a conservation method comprises field drying grain for dry storage.

The method of the present invention further comprises the step of mixing the grain of crop plants together based on the starch digestibility characteristics of the grain.

The method of the present invention further includes producing desired particle size of the grain after grinding based on the starch digestibility characteristics of the grain.

The method of the present invention further comprises determining the quantity of grain for use in a feed formulation based on starch digestibility characteristics of the grain.

The method of the present invention further comprises determining the quantity of the grain to be used in a feed formulation based on the degree of rate and extent of digestion of the grain.

The method of the present invention includes enhancing the energy utilization of a feed formulation by mixing identity preserved grains together in a formulation to obtain a specified degree of rate and extent of digestion of the feed formulation.

The method of the present invention further comprises determining the quantity of the grain to be used in a feed formulation based on the compatibility of a forage source and rate of starch digestion of the grain.

The method of the present invention further comprises determining the quantity of the grain to be used in a feed formulation based on the level of forage NDF and the degree of rate and extent of starch digestion of grain to be used in the feed formulation.

The method of the present invention further comprises determining the quantity of grain to be used in a feed formulation based on the dNDF of the forage and the degree of rate and extent of starch digestion of grain to be used in the formulation.

DETAILED DESCRIPTION OF THE INVENTION

I. Interactive Effect of a Plant Crop and the Environment

Six corn hybrids were grown in duplicate plots in 3 locations in the 1999 growing season. Locations were East Lansing, Mich.; Lincoln, Nebr.; and University Park, Pa. The six hybrids included several endosperm types: 1 floury, 1 opaque-2, 1 waxy, 1 dent and 2 flint hybrids. Plots were 32 rows wide by 400' long (30" rows).

Each field was monitored once per week beginning September 15. Following physiological maturity at black layer (BL), grain dry matter (DM) was determined weekly for all plots. Grain was harvested at 60%, 70% and 80% DM from all plots. To minimize probability of cross-pollination, ten ears were harvested from each of the middle two rows of each plot (rows 16 and 17) for a total of 20 ears. Ears were not harvested from plants within 100' of the ends of the 400' long plots and were taken approximately every 20' along the 200' remaining. Grain was shelled from the ears by hand. A 500 g sample of grain was taken for determination of DM, vitreousness, and density. The remainder of the grain was rolled and ensiled in duplicate 4"×12" PVC experimental silos. An additional sample (0.5 kg) was taken as a 0 time sample.

One of each duplicate silo from each plot and maturity was opened at 35-d after harvest and the other was opened at 120-d after harvest. Contents of silos were frozen for subsequent analysis. Samples were ground with dry ice (Wiley mill, 1-mm screen) before analysis. In vitro starch degradation was determined after incubation for 7 h in buffered media with 20% rumen fluid.

All samples were characterized for starch, sugars, ether extract, crude protein content, and protein solubility in sequential buffers. Samples of intact kernels taken at harvest were analyzed for vitreousness and density in ethanol (Philippeau and Michalet-Doreau, 1997). Samples taken after rolling that were not ensiled (n=72) were dried at 55° C., dry sieved and analyzed for particle size. Starch degradability, also referred to herein as digestibility, was determined by vitro starch digestion with rumen microbes and measuring starch disappearance over time. Other methods for measuring starch digestion known in include gas production, in vitro starch disappearance using enzymes, and in situ starch digestion.

Vitreousness of endosperm for the hybrids tested ranged from 4 to 62%. Table I shows that starch digestion was affected by the corn hybrid (49.8 to 60.3%, $P<0.001$). Table 2 shows that starch digestion increased with moisture content (46.0 to 65.8%, $P<0.001$). Table also shows that starch digestion was affected by ensiling (0 days vs. 35 days and 120 days, 463% vs. 59.3%, $P=0.001$), and time of ensiling (35 days vs. 120 days, 57.4% vs. 61.25%, $P<0.001$).

Table 3 establishes that starch digestion is dependent on several interactions between hybrid and the environment. A p-value of less than 0.05 is significant for single sources, whereas a p-value of less than 0.1 is significant for interactions between sources. Thus, location, moisture, hybrid, day, all had a significant affect on starch digestibility. The results show that the interactions of Moisture×Day, Moisture×Location, Moisture×Hybrid, and Hybrid×Location were all significant. For example, the affect of the hybrid on starch digestibility changed at different moisture levels. Table 3 also shows that a hybrid's affect on starch digestibility depends on the location where it was grown and, therefore, starch digestibility of a particular hybrid varies across different locations. Tables 4, 5, 6 and 7 show the data for the interaction between hybrids and their growth environments and the affect these interactions have on starch digestibility of the hybrids. For example, Table 4 shows that the affect of Day×Moisture on starch digestibility is disproportionate to either environmental factor alone. Likewise, the interactive effects of Moisture×

Location (Table 5), Moisture×Hybrid (Table 6), and Hybrid× Location (Table 7) all show strong interactive affects on starch digestibility.

TABLE 1

Corn hybrid means for in-vitro starch digestibility (IVSD), averaged over three stages of maturity, 3 post harvest intervals, 2 plots per location and 3 locations.
Effect of Hybrid on IVSD

| Hybrid | IVSD |
|---|---|
| N4342 wx | 49.8 |
| 6409 GQ | 50.9 |
| W1698 | 54.3 |
| N4640Bt | 57.5 |
| NX7219 | 57.5 |
| SL-53 | 60.3 |
| SE = 1.26 | |

TABLE 2

IVSD means for three moistures and three storage intervals.

| Effect of Moisture % on IVSD | | Effect of Day on IVSD | |
|---|---|---|---|
| Moisture % | IVSD | Day | IVSD |
| 20 | 46.0 | 0 | 46.3 |
| 30 | 53.1 | 35 | 57.4 |
| 40 | 65.8 | 120 | 61.2 |
| SE = 1.03 | | SE = 0.84 | |

TABLE 3

Levels of significance for pertinent sources of variation in IVSD.
Treatment Effects on IV Starch Digestibility

| Source | Degrees of Freedom (DF) | Prob > F |
|---|---|---|
| Location | 2 | 0.19 |
| Moisture | 2 | <0.0001 |
| Hybrid | 5 | <0.0001 |
| Day | 2 | <0.0001 |
| Moisture × Day | 4 | <0.0001 |
| Moisture × Location | 4 | 0.07 |
| Moisture × Hybrid | 10 | 0.08 |
| Hybrid × Location | 10 | 0.08 |

TABLE 4

IVSD Moisture × Day interaction means for three moistures and three storage intervals
Moisture × Day

| | Day | | |
|---|---|---|---|
| Moisture % | 0 | 35 | 120 |
| 20 | 43.9 | 46.7 | 47.5 |
| 30 | 44.1 | 55.5 | 59.7 |
| 40 | 50.8 | 70.1 | 76.4 |

TABLE 5

IVSD Moisture × Location interaction means for three moistures and three locations
Moisture × Location

| | Location | | |
|---|---|---|---|
| Moisture % | #1 | #2 | #3 |
| 20 | 46.1 | 46.8 | 45.2 |
| 30 | 51.5 | 54.6 | 53.3 |
| 40 | 63.8 | 63.2 | 70.3 |

TABLE 6

IVSD Moisture × Hybrid interaction means for three moistures and six hybrids
Moisture × Hybrid

| | Moisture % | | |
|---|---|---|---|
| Hybrid | 20 | 30 | 40 |
| N4342wx | 41.7 | 44.3 | 63.4 |
| 6409 GQ | 40.9 | 52.8 | 58.9 |
| W1698 | 44.6 | 52.7 | 65.8 |
| N4640Bt | 47.8 | 57.8 | 65.0 |
| NX7219 | 49.9 | 52.5 | 70.2 |
| SL-53 | 51.4 | 58.6 | 71.2 |

TABLE 7

IVSD Hybrid × Location interaction means for six hybrids and three locations. The number in parentheses is the rank of the hybrid within location.
Hybrid × Location

| | Location | | |
|---|---|---|---|
| Hybrid | #1 | #2 | #3 |
| N4342wx | 51.1 (4) | 51.4 (5) | 46.9 (6) |
| 6409 GQ | 49.7 (6) | 50.1 (6) | 52.8 (5) |
| W1698 | 50.0 (5) | 54.2 (4) | 58.7 (2) |
| N4640Bt | 56.2 (3) | 61.2 (2) | 53.2 (4) |
| NX7219 | 56.4 (2) | 58.9 (3) | 57.3 (3) |
| SL-53 | 59.4 (1) | 61.5 (1) | 60.2 (1) |

II. Measurement of Starch and Fiber Degradability Characteristics

To measure starch degradability in vitro, a set of crop plant samples comprising a number of genetically different crop plants are analyzed for starch concentration before and after incubation in media inoculated with rumen fluid containing ruminal microbes for various lengths of times. Starch degradability is calculated as the amount of starch that disappeared as a percent of the total starch in the sample for each time point of interest. Starch concentration can be determined by analysis of glucose concentration before and after hydrolysis using commercially available analysis kits. Glucose concentration may be determined enzymatically using glucose oxidase method or by high performance liquid chromatography. For general methods of measuring feed digestibility in vitro see Goering and Van Soest (1970). An alternative method is to incubate feed samples in porous bags in the rumen of cattle or sheep. (Philippeau and Michalet—Doreau, 1997)

To measure fiber digestibility in vitro, dried plant tissues were ground with a Wiley® mill to pass a 1 mm screen. In vitro true digestibility (IVTD) and in vitro neutral detergent fiber digestibility was determined using 0.5 g samples using a modification of the method of Goering and Van Soest (1970) with an incubation time representing the rumen residence time of the animal of interest such as 30 h. Undigested IVTD residue was subjected to the neutral detergent fiber (NDF) procedure (Goering and Van Soest, 1970). A modification of the NDF procedure was the treatment of all samples with 0.1 ml of alpha-amylase during refluxing and again during sample filtration, as described by Mertens (1991). Alpha-amylase was assayed for activity prior to use, according to Mertens (1991). NDF digestibility (dNDF) for each sample was computed by the equation: $100*[(NDF-(100-IVTD))/NDF]$.

Near Infrared reflectance spectroscopy (NIRS) is a nondestructive, instrumental method for rapid, accurate, and precise determination of the chemical composition of forages and feedstuffs. NIRS is an accepted technology for feed and forage analysis, and industrial uses. NIRS has several distinct advantages: the speed of analysis, non-destructive analysis of the sample, simplicity of sample preparation, and several analyses can be completed with one sample. Since NIRS analysis is relatively simple to perform, operator-induced errors are reduced (Shenk and Westerhaus, 1994).

According to the present invention, databases are developed relating the NIR spectrum to the starch and fiber degradability characteristics of a number of genetically different crop plants. The NIR spectrums of a given crop plant such as corn, soybean, or alfalfa are used to assess the crop plant's starch and fiber degradability characteristics. The NIRS method may be applied to various feed crops and the traits of those crops. NIRS requires a calibration to reference methods (Shenk and Westerhaus, 1994). Each constituent requires a separate calibration, and in general, the calibration is valid for similar types of samples.

Briefly, the NIRS method includes obtaining a set of crop plant samples with known characteristic such as starch and fiber degradability. These characteristics are measured according to the starch and dNDF measurement methods described above. Other starch and dNDF measurement methods known in the art can be used as well. These crop plant samples are scanned in the near infrared spectrum. Reflectance in the near-infrared spectrum is then recorded. A prediction equation for each trait is developed by regressing the known measured characteristics on reflectance across wavelengths for each set of samples.

For each trait, the prediction equation is validated by predicting the characteristic of interest for an independent set of samples. According to the present invention, the measured characteristics of interest are rate of starch digestion and starch digestibility at specific times. Fiber digestibility is also a characteristic of interest.

The NIRS method of analysis is based on the relationship that exists between infrared absorption characteristics and the major chemical components of a sample (Shenk and Westerhaus, 1994). The near infrared absorption characteristics can be used to differentiate the chemical components. Each of the significant organic plant components has absorption characteristics (due to vibrations originating from the stretching and bending of hydrogen bonds associated with carbon, oxygen and nitrogen) in the near infrared region that are specific to the component of interest. The absorption characteristics are the primary determinants of diffuse reflectance, which provides the means of assessing composition. The diffuse reflectance of a sample is a sum of the absorption properties combined with the radiation-scattering properties of the sample. As a consequence the near infrared diffuse reflectance signal contains information about sample composition. Appropriate mathematical treatment of the reflectance data will result in extraction of compositional information. (Osboure et al., 1986). The most rudimentary way to illustrate this would be to measure the reflectance at two wavelengths, with one wavelength chosen to be at a maximum absorption point and the other at the minimum absorption point, for the compositional factor to be analyzed. The ratio of the two reflectance values, based on determination of two samples, can be associated, by correlation, to the concentration of the specific compositional factor in those samples. By use of the correlation relationship, an equation can be developed that will predict the concentration of the compositional factors from their reflectance measurements (Osboure et al., 1986).

Spectra can be collected from the sample in its natural form, or as is often the case with plants or plant parts, they are ground, typically to pass through a 1-mm screen. NIR reflectance measurements are generally transformed by the logarithm of the reverse reflectance ($\log(1/R)$) (Hruschka, 1987), other mathematical transformations known in the art may be used as well. Transformed reflectance data are further mathematically treated by employment of first- or second-derivatives, derivatives of higher order are not commonly used (Shenk and Westerhaus, 1994).

The calibration techniques employed are multiple linear regression (MLR) methods relating the NIR absorbance values (x variables) at selected wavelengths to reference values (y values), two commonly used methods are step-up and stepwise regression (Shenk and Westerhaus, 1994). Other calibration methods are principal-component regression (PCR) (Cowe and McNicol, 1985), partial least-squares regression (PLS) (Martens and Naes, 1989), and artificial neural networks (ANN) (Naes et al., 1993).

The methods of calibration equation differ depending on the regression method used. The procedure when using MLR is to randomly select samples from the calibration population, exclude them from the calibration process and then use them as a validation set to assess the calibration equation (Windham et. al., 1989). The method of equation validation used for PCR or PLS regression is cross-validation, which involves splitting the calibration set into several groups and conducting calibration incrementally on every group until each sample has been used for both calibration and validation (Jackson, 1991; Martens and Naes, 1989; Shenk and Westerhaus, 1994).

In this instance NIRS involves the collection of spectra for a set of samples with known characteristics. The spectra is collected from grain kernels, or other plant parts, and mathematically transformed. A calibration equation is calculated using the PLS method, other regression methods known in the art may be used as well. Criteria used to select calibration equations are low standard errors of calibration and cross validation and high coefficients of multiple determinations.

III. Real Time Feed Formulation Method

Crops about to be harvested are analyzed for starch and fiber degradation characteristics before harvest to provide information needed for harvesting decisions. A representative sample of each field is obtained and scanned using an NIR spectrophotometer at the wavelengths required by the prediction equation previously developed. Starch and/or fiber digestion characteristics of the plants in each field are predicted using this equation. Information provided is used to make harvest decisions such as the moisture concentration at harvest and particle size to grind for high moisture grain and the conservation method (high moisture grain or dry grain). This gives additional control over the resulting feed consumed by cattle and sheep, which helps optimize energy intake and nutrient utilization. The NIRS analysis is done in a laboratory or in the field using a portable NIRS instrument.

The present invention is directed to measuring starch and fiber digestibility in real time, and not necessarily directed to the particular instruments or methods used to measure starch and/or fiber digestibility. According to the present invention, it is desirable that the methods to measure these traits are relatively quick. e.g., in real time. Real time refers to obtaining the starch and fiber digestibility results within 48 hours from when the samples are obtained and tested, and more preferably within 24 hours from when the samples are obtained and tested.

Stored feed samples are screened for starch and fiber digestibility characteristics to provide information to formulate diets for optimal energy intake and nutrient utilization. Feeds with highly degradable starch are limited in diets to prevent ruminal acidosis, lower fiber digestibility and efficiency of microbial protein production, and decrease energy intake. Feed with low starch degradability is limited to optimize microbial protein production, nutrient utilization and energy intake.

The present invention also includes using traditional real time screening techniques, such as wet chemistry, to determine the starch and/or fiber digestibility characteristics of a particular crop in the field or a crop that is stored on an identity preserved basis. The invention, therefore includes, analyzing the starch and/or fiber digestibility of an identity preserved crop in real-time, using techniques described herein or other techniques known in the art, and using that information to prepare feed formulations that optimize ruminant productivity.

The present invention also includes growing a crop at a particular location and determining the starch degradability characteristics of the crop plant used as grain or NDF digestibility if used as a forage in real time, before or after harvest, by NIRS. The crop plant or plant parts are stored on an identity preserved basis. Based on specific diet requirements, conservation methods such as high-moisture fermentation or harvesting field dried, and processing including either rolling or grinding, are used to alter measured starch degradability. Once a specific starch degradability target/requirement for a ruminant herd is determined, a blending process of mixing fast and slow starch degradation properties that have been accurately measured according to the present invention are incorporated into a feed formulation for optimum ruminant productivity.

It is understood that the present invention is applicable to corn, alfalfa, and other forage crops, and can also be used to characterize forage sources in real time. Thus, the term "crop plant" or "crop" is meant to include any plant that is used as silage, grain or other plant based feed ingredient for ruminant animals.

The plant characteristics, energy (digestibility), protein and fiber content of both corn grain and corn forage is affected by the interaction of genetics by environment (G×E). Thus, according to the present invention, real time characterization of each source of starch (grain) and NDF (fiber) is necessary to accurately formulate diets for ruminates. Once an animal production target is determined, a total mixed ration (TMR) is designed by combining energy, protein, fiber, vitamins and mineral ingredients into a mixer wagon based on predetermined metabolizable energy (ME) targets, crude protein and meeting adequate and sufficient fiber requirements.

Meeting the total ration NDF target and the level of NDF as a percentage of the total forage in the diet determines the forage component of the base diet. An adjusted ME value for the forage sources is determined to account for the energy contribution (NDF digestibility) from the forage NDF.

The production requirement of the diet and the forage/fiber composition of the diet will determine the optimal amount and source of supplemental starch, with either a fast, slow or mid-point of starch degradability needed to make the most feed efficient, productive and healthy diet formulation. The forage characteristics of the diet also determines the optimum moisture content of the starch, either dry grain (15.5%) or high moisture grain, such as high moisture corn (HMC) at 28-32% by weight, and which conservation and processing methods are advantageous to the production and health impact of the diet.

It is understood, therefore, that the present invention is a process that optimizes a ruminant feed formulation by analysis of identity preserved feed components on a real time basis. It is further understood that the present invention includes using various methods of measuring, in real time, crop plant characteristics.

LITERATURE CITED

Dado, R. G., and R. W. Briggs. 1996. Ruminal starch digestibility of grain from high-lysine corn hybrids harvested after black layer. J. Dairy Sci. 79(Suppl. 1):213.

Philippeau, C. and B. Michalet-Doreau. 1996. Influence of genotype of corn on rate of ruminal starch degradation. J. Dairy Sci. 79(Suppl. 1):138.

Philippeau, C. and B. Michalet-Doreau. 1997. Influence of genotype and stage of maturity of maize on rate of ruminal starch degradation. Animal Feed Sci. Tech. 68:25-35.

Philippeau, C. and B. Michalet-Doreau. 1999. Influence of genotype and ensiling of corn grain on in situ degradation of starch in the rumen. J. Dairy Sci. 81:2178-2184.

Stock, R. A., M. H. Sindt, R. Cleale IV, and R. A. Britton. 1991. High-moisture corn utilization in finishing cattle. J. Anim. Sci. 69:1645.

Watson, S. A., and P. E. Ramstad. Ed. 1987. Corn Chemistry and Technology. Am. Soc. Cereal Chem., St. Paul, Minn.

Cowe, L. A. and J. W. McNicol. 1985. The use of principal components in the analysis of near infrared spectra. Applied Spectroscopy 39:257-266.

Jackson, J. E. 1991. A user's guide to principal components. John Wiley and Sons. New York, N.Y.

Hruska, W. R. 1987. Data analysis: Wavelength selection methods. p. 35-56. In P. Williams and K. Norris (ed.) Near-infrared technology in the agricultural and food industries. American Association of Cereal Chemists. St. Paul, Minn.

Martens, H., and T. Naes. 1989. Multivariate calibration. John Wiley and Sons, New York, N.Y.

Naes, T., K. Kvaal, T, Isaksson, and C. Miller. 1993. Artificial neural networks in multivariate calibration. Journal of Near Infrared Spectroscopy 1:1-12.

Osbourne, B. G., T. Fearn, and P. H. Hindle. 1986. Practical NIR spectroscopy with applications in food and beverage analysis. Longman Scientific and Technical. Essex, England.

Shenk, J. S. and M. O. Westerhaus. 1994. The application of near infrared reflectance spectroscopy (NIRS) to forage analysis. p. 406-499. In G. C. Fahey (ed.) Forage quality, evaluation, and utilization. National conference on Forage quality, evaluation, and utilization, University of Nebraska, Lincoln, Nebr., 13-15 Apr. 1994. ASA, CSCA, SSSA, Madison, Wis.

Windham, W. R., D. R. Mertens, F. E. Barton II. 1989. Supplement 1. Protocol for NIRS calibration: sample selection and equation development and validation. p.

96-103 In: Marten, G. C., J. S. Shenk, and F. E. Barton II (eds.) Near infrared reflectance spectroscopy (NIRS): Analysis of forage quality. USDA Agricultural handbook No. 643 Washington, D.C.

Goering, H. K., and P. J. Van Soest. 1970. Forage fiber analysis: apparatus, reagents, procedures, and some applications. USDA-ARS Handbook 379. U.S. Govt. Print. Office, Washington, D.C.

Martens, G. C., and R. F. Barnes. 1980. Prediction of energy digestibilities of forages with in vitro rumen fermentation and fungal enzyme systems. p. 61-71. In W. J. Pigden et al. (ed.) Proc. Int. Workshop on standardization of analytical methodology for feeds. IDRC-134e, Ottawa, Canada. 12-14 Mar. 1979. Unipub. New York, N.Y.

Mertens, D. R. 1991. Neutral detergent fiber. p. A12-A16. In Proc. National Forage Testing Association forage analysis workshop. Milwaukee, Wis. 7-8 May 1991.

What is claimed is:

1. A feed ration for a ruminant animal for achieving optimum productivity, comprising:
   (a) a forage component sourced from a crop plant in current time;
   (b) a grain component sourced from a crop plant in current time;
   (c) a baseline starch digestibility characteristic(s) previously determined from a grain or forage component of a prior set of crop plant samples corresponding to the forage crop plant or grain crop plant;
   (d) a prediction equation previously developed for the forage crop plant or grain crop plant, based upon the previously determined baseline starch digestibility characteristic(s);
   (e) a real-time characterization determined within 48 hours of a starch digestibility trait of the grain component, or both the grain and forage components, by inputting electronically recorded analysis data from the grain component or grain and forage components into the prediction equation; and
   (f) proportionate quantities of the grain and the forage components for incorporation into the feed ration based upon the real-time characterization results for the starch digestibility trait of the grain component or both the grain and forage components.

2. The feed ration of claim 1, wherein the starch digestibility trait real-time characterization of the grain component or the grain and forage components comprises the rate and extent of starch digestion.

3. The feed ration of claim 1 further comprising:
   (a) a baseline neutral detergent fiber ("NDF") digestibility ("NDFd") characteristic previously determined from a forage component of a prior set of crop plant samples corresponding to such forage crop plant;
   (b) a prediction equation previously developed for such forage crop plant, based upon the previously determined baseline NDFd characteristic; and
   (c) a real-time characterization within 48 hours of the trait of the forage component by inputting electronically recorded analysis data from such forage component into such prediction equation.

4. The feed ration of claim 3, wherein the proportionate quantity of the grain used in the feed ration is determined based upon the NDF digestibility of the forage and the rate and extent of starch digestion of the grain.

5. The feed ration of claim 1, wherein the real-time characterization of the starch digestibility applied to the forage or grain component comprises near infrared spectroscopy ("NIRS").

6. The feed ration of claim 1 further comprising a second grain component sourced from a second crop plant, wherein the grain component sourced from a crop plant in current time and the second grain component are blended together within the feed ration to obtain a specific rate and extent of digestion of the feed ration.

7. The feed ration of claim 1 further comprising a conservation method applied to the crop plant selected from the group consisting of harvesting grain for storage as high-moisture grain, field drying grain for dry storage, harvesting forage for storage as high-moisture fermented forage, or producing a desired particle size of the grain after grinding based upon the starch digestibility characteristics of the grain.

8. The feed ration of claim 7, wherein the conservation method comprises producing a desired particle size of the grain after grinding based upon the starch digestibility characteristics of the grain.

9. The feed ration of claim 1, wherein the crop plant comprises corn.

10. The feed ration of claim 9, wherein the crop plant comprises brown midrib corn.

11. The feed ration of claim 1, wherein the crop plant comprises alfalfa.

12. The feed ration of claim 1, wherein the crop plant comprises grass forage.

13. The feed ration of claim 1, wherein the ruminant animal comprises a dairy cow.

14. The feed ration of claim 1, wherein the ruminant animal comprises a beef steer.

* * * * *

UNITED STATES PATENT AND TRADEMARK OFFICE
CERTIFICATE OF CORRECTION

| | | |
|---|---|---|
| PATENT NO. | : 7,490,437 B1 | Page 1 of 2 |
| APPLICATION NO. | : 11/584767 | |
| DATED | : February 17, 2009 | |
| INVENTOR(S) | : James F. Beck | |

It is certified that error appears in the above-identified patent and that said Letters Patent is hereby corrected as shown below:

On the Title Page, Item (76) "Inventor: James F. Beck, 13823 Jasmine Way, Rogers, MN (US) 55374" should be changed to --Inventor: James F. Beck, 2241 Kallie Court, Stillwater, MN (US) 55082--.

On the Title Page, "14 Claims, No Drawings" should be changed to --22 Claims, No Drawings--.

In the claims, insert the following:

Col. 13, lines 1-8
--42. The feed ration of claim 39 further comprising:
    (a) a baseline neutral detergent fiber ("NDF") level characteristic previously determined from a forage component of a prior set of crop plant samples corresponding to such forage crop plant;
    (b) a prediction equation previously developed for such forage crop plant, based upon the previously determined baseline NDF level characteristic; and
    (c) real-time characterization within 48 hours of the NDF trait of the forage component by inputting electronically recorded analysis data from such forage component into such prediction equation.--

Col. 13 lines 10-12
--44. The feed ration of claim 39, wherein the proportionate quantity of the grain used in the feed ration is determined based upon the starch digestion characteristics of the grain.--

Col. 13 lines 13-15
--45. The feed ration of claim 41, wherein the proportionate quantity of the grain used in the feed ration is determined based upon the degree of rate and extent of digestion of the grain.--

Col. 13 lines 16-18
--46. The feed ration of claim 39, wherein the proportionate quantity of the grain used in the feed ration is determined based upon the compatibility of a forage source and rate of starch digestion of the grain.--

Signed and Sealed this

Twenty-second Day of June, 2010

David J. Kappos
*Director of the United States Patent and Trademark Office*

CERTIFICATE OF CORRECTION (continued)
U.S. Pat. No. 7,490,437 B1

In the claims, insert the following (continued from page 1):

Col. 13 lines 19-21
--47. The feed ration of claim 42, wherein the proportionate quantity of the grain used in the feed ration is determined based upon the level of forage NDF and the degree of rate and extent of starch digestion of the grain.--

Col. 13 lines 22-24
--53. The feed ration of claim 52, wherein the conservation method comprises harvesting the crop plant as high-moisture grain.--

Col. 13 lines 25-26
--54. The feed ration of claim 52, wherein the conservation method comprises harvesting the crop plant for storage as high-moisture fermented forage.--

Col. 13 lines 27-28
--55. The feed ration of claim 52, wherein the conservation method comprises field drying the crop plant for use as dry forage.--